United States Patent
Cowman et al.

(10) Patent No.: US 11,274,397 B2
(45) Date of Patent: Mar. 15, 2022

(54) COPOLYMER, AQUEOUS SOLUTION COMPRISING THE COPOLYMER AND METHOD FOR REDUCING NEGATIVE EFFECTS OF NATURAL PITCH AND ADHESIVE CONTAMINANTS IN BOTH PULPING AND PAPERMAKING OPERATIONS

(71) Applicant: Archroma IP GmbH, Reinach (CH)

(72) Inventors: John Cowman, Bradford (GB); Paul Dekock, Wakefield (GB); Damien Julien Corpet, Oslon (FR)

(73) Assignee: Archroma IP GmbH, Reinach (CH)

( * ) Notice: Subject to any disclaimer, the term of this patent is extended or adjusted under 35 U.S.C. 154(b) by 236 days.

(21) Appl. No.: 16/481,524

(22) PCT Filed: Jan. 30, 2018

(86) PCT No.: PCT/EP2018/052260
§ 371 (c)(1),
(2) Date: Jul. 29, 2019

(87) PCT Pub. No.: WO2018/141740
PCT Pub. Date: Aug. 9, 2018

(65) Prior Publication Data
US 2019/0382957 A1 Dec. 19, 2019

(30) Foreign Application Priority Data
Jan. 31, 2017 (EP) .................................. 17154043

(51) Int. Cl.
*D21H 17/43* (2006.01)
*C08F 212/08* (2006.01)
*D21H 21/02* (2006.01)
*D21H 23/04* (2006.01)

(52) U.S. Cl.
CPC ........... *D21H 17/43* (2013.01); *C08F 212/08* (2013.01); *D21H 21/02* (2013.01); *D21H 23/04* (2013.01); *C08F 2800/10* (2013.01); *C08F 2800/20* (2013.01)

(58) Field of Classification Search
USPC ....................................................... 162/164.7
See application file for complete search history.

(56) References Cited

U.S. PATENT DOCUMENTS

| | | |
|---|---|---|
| 3,992,249 A | 11/1976 | Farley |
| 2011/0136963 A1 | 6/2011 | Couvreur |
| 2013/0059766 A1 | 3/2013 | McKiernan et al. |
| 2015/0027652 A1 | 1/2015 | Cowman et al. |

FOREIGN PATENT DOCUMENTS

| | | |
|---|---|---|
| CA | 3026355 A1 | 12/2017 |
| CN | 102177183 A | 9/2011 |
| CN | 103509150 A | 1/2014 |
| CN | 105 713 131 A | 6/2016 |
| CN | 105801740 A | 7/2016 |
| EP | 2 639 350 A1 | 9/2013 |
| EP | 3464481 A1 | 4/2019 |
| JP | 2000 248483 A | 9/2000 |
| RU | 2578597 C2 | 3/2016 |
| TW | 201542607 A | 11/2015 |
| WO | 2011/015297 A1 | 2/2011 |
| WO | 2017210606 A1 | 12/2017 |

OTHER PUBLICATIONS

JP 2000248483, Yamaguchi Zenji et al., Dec. 2000, machine translation.*
PCT International Search Report for PCT/EP2018/052260, dated Apr. 6, 2018.

* cited by examiner

*Primary Examiner* — Mark Halpern
(74) *Attorney, Agent, or Firm* — McBee Moore & Vanik IP, LLC

(57) ABSTRACT

The present invention relates to a copolymer comprising at least one hydrophilic monomer; at least one hydrophobic monomer and at least 10% by weight of methyl styrene, particularly suitable to be used as detackifying agent for reducing negative effects caused by natural pitch and/or adhesive contaminants in both pulping and papermaking operations.

20 Claims, No Drawings

COPOLYMER, AQUEOUS SOLUTION COMPRISING THE COPOLYMER AND METHOD FOR REDUCING NEGATIVE EFFECTS OF NATURAL PITCH AND ADHESIVE CONTAMINANTS IN BOTH PULPING AND PAPERMAKING OPERATIONS

CROSS-REFERENCE TO RELATED APPLICATIONS

This application is the National Stage entry of International Application No. PCT/EP2018/052260, filed 30 Jan. 2018, which claims priority to European Patent Application No. 17154043.8, filed 31 Jan. 2019.

BACKGROUND

Field

FIELD OF THE INVENTION

The present invention relates to a copolymer comprising at least one hydrophilic monomer, at least two hydrophobic monomers wherein one of the hydrophobic monomers is methyl styrene which is present in the copolymer in at least 10% by weight, particularly suitable to be used as detackifying agent for reducing negative effects caused by natural pitch and/or adhesive contaminants in both pulping and papermaking operations.

The copolymer according to the invention can further be used as a fixative for cationic additives in paper sheet formation, or in the treatment of fabrics in fiber preparation plants to protect resulting fabrics from hydrophobic contamination, or for the showering of washer and thickener fabrics to prevent deposition of stickies and maintain porosity.

The invention also relates to an aqueous copolymer solution comprising the copolymer according to the invention, a method for reducing negative effects caused by natural pitch and/or adhesive contaminants in both pulping and papermaking operations, and the use of the copolymer, respectively the aqueous copolymer solution in aqueous cellulosic pulp slurries for reducing negative effects caused by natural pitch and/or adhesive contaminants in both pulping and papermaking operations.

Description of Related Art

The production of paper represents an important industry all over the world. The paper production process includes the use of natural wood sources as well as the use of waste paper as starting materials, each of the starting materials causing different problems in the paper making process.

Whether using wood and/or waste paper, the first step is to dissolve the starting material into a pulp and thus producing so-called cellulosic pulp slurry. Regardless of the type of pulping process used, the wood and/or waste paper are broken down into its component elements such that the fibers can be separated. The pulping results in a mass of individual fibers being produced. The fibers are then washed and screened to remove remaining fibers bundles. After that the water is pressed out and the residue is dried.

Pulps from natural sources contain a considerable proportion of organosoluble matter which is generally referred to as resin or pitch. The resins are extracted from the wood during the pulping process and constitute a significant nuisance in cellulosic suspensions because the resin particles are sticky, tend to agglomerate and form adherent deposits on the pulping and papermaking machinery. The removal of water during papermaking is normally carried out using a type of fabric mesh, commonly referred to as machine wires or felts. Resin or pitch deposits clog and block the small openings in the fabrics inhibiting drainage and causing sheet defects, such as holes in the finished paper. Deposits which accumulate on the internal surfaces of pulp and backwater chests can suddenly be released and displayed as resin lumps in the paper sheet. Larger lumps can break the paper sheet in the machine, leading to loss of production.

For economic reasons recycling of waste paper made from natural fiber materials is state of the art. However, the paper making process using waste paper has become increasingly difficult due to sticky contaminants (so called "stickies"). Increasing amounts of mixed waste paper as raw material source in papermaking processes cause large quantities of solid and/or water-insoluble, sticky components to be incorporated in the paper machine circulations systems. A complete removal of for example adhesives of self-adhesive labels, hot melts, adhesive dash components of recycled coated papers and boards is not possible despite increasing mechanical cleaning efforts. They represent a significant cause of so-called "stickies" and "white pitch" that often deposited due to their hydrophobic properties on hot and moving parts and in the wires and felts of paper machines and thus can lead to web breaks.

For years, there have been products supplied as detackifying agents for treating pulp contaminants such as pitch from natural sources or stickies from waste paper. EP 2 639 350 A1 discloses resin and pitch control agents in form of aqueous, non-film forming polymer dispersions and a process for preventing the deposition of pitch particles in cellulosic pulp suspensions by use of such polymer dispersions. WO 2011/015297 A1 discloses a method for reducing negative effects of adhesive synthetic contaminants in systems of substances comprising waste paper. Both publications disclose that the detackifying polymer compositions are provided in form of polymer dispersions containing a certain solid content. Both prior art documents emphasize the importance of relatively high glass transition temperatures of the (co)polymers used in aqueous dispersions for the treatment of pulps.

U.S. Pat. No. 3,992,249 also relates to a method for inhibiting the deposition of pitch onto the surface of pulp making equipment during the manufacture of pulp from wood pulp in an alkaline pulping process by adding certain anionic vinyl polymers carrying hydrophobic-oleophilic and hydrophilic substituents.

However, there is the need to provide further compositions and methods which reduce the negative effects of natural pitch and adhesive contaminants in pulping and paper making operations.

SUMMARY

The object is solved by providing a copolymer comprising at least one hydrophilic monomer and at least two hydrophobic monomers, wherein one of the hydrophobic monomers is methyl styrene, which is present in an amount of at least 10% by weight based on the total weight of the copolymer.

Further, the copolymer according to the invention comprises at least one hydrophilic monomer selected from acrylic acid or methacrylic acid or a mixture thereof, at least 10% by weight of methyl styrene based on the total weight of the copolymer, and at least another hydrophobic monomer selected from the group consisting of styrene, methyl methacrylate, acrylonitrile, divinyl benzene, trivinyl benzene or a mixture thereof.

Further the copolymer according to the invention comprises at least 25% and at most 40% by weight of acrylic acid, at least 20% and at most 50% by weight of methyl styrene, and at least 15% and at most 55% by weight, or at most 70% by weight of styrene wherein the given weight percentage ranges are based on the total weight of the copolymer.

Further the copolymer according to the invention has a glass transition temperature $T_g$ in the range of at least 105° C., preferably at least 115° C., more preferably at least 120° C.

Further the copolymer according to the invention has a weight average molecular weight in the range of 7000 g/mol to 20000 g/mol.

Further the copolymer according to the invention comprises at least one monovalent cation for balancing an anionic charge located at at least one hydrophilic monomer.

Further the copolymer according to the invention comprises at least one monovalent cation is selected from $H^+$, or $Li^+$, or $Na^+$, or $K^+$, or $NH_4^+$, or ammonium which is mono-, di-, tri- or tetrasubstituted by a linear or branched alkyl radical, or ammonium which is mono-, di-, tri- or tetrasubstituted by a linear or branched hydroxyalkyl radical, or ammonium which is di-, tri-, or tetrasubstituted by a mixture of linear or branched alkyl radical(s), or linear or branched hydroxyalkyl radical(s), or protonated amino alcohols like preferably protonated aminomethyl propanol or combinations of the listed cations thereof.

In another aspect, the present application is related to an aqueous copolymer solution comprising at least one copolymer according to the invention.

Further, the aqueous copolymer solution according to the invention comprises the copolymer according to the invention in a concentration range of at least 100 g/l to at most 400 g/l.

Another aspect of the present application is related to a method for reducing natural pitch and adhesive contaminants deposition on pulp and paper making equipment characterized in that a copolymer according to the invention is used.

Further, the wherein the concentration of the copolymer according to the invention when used in the method according to the invention in the pulp is in the range of at least 100 g/tons to 600 g/tons with respect to the dry pulp.

Further, the copolymer according to the invention is used as aqueous copolymer solution according to the invention in the method according to the invention.

In a further aspect the present application is related to the use of the aqueous copolymer solution according to the invention or the copolymer according to the invention for reducing natural pitch and adhesive contaminants deposition on pulp and paper making equipment.

Further, in the described use according to the invention, the water hardness of the aqueous pulp lies in the range of 0° dH to 14° dH, more preferably in the range of 0° dH to 8.4° dH.

Further, in the described use according to the invention, the amount of the aqueous copolymer solution according to the invention applied to the cellulosic pulp slurry is at least 0.01% by weight to at most 0.5% by weight, more preferably at least 0.01% by weight to at most 0.3% by weight, even more preferably at least 0.1% by weight to at most 0.2% by weight, based on the dry weight of the cellulosic pulp.

In another aspect the present application is related to the use of aqueous copolymer solution according to the invention or the copolymer according to the invention as a fixative for cationic additives in paper sheet formation, or in the treatment of fabrics in fiber preparation plants to protect resulting fabrics from hydrophobic contamination, or for the showering of washer and thickener fabrics to prevent deposition of stickies and maintain porosity.

DETAILED DESCRIPTION OF A PREFERRED EMBODIMENT

Claimed herein is a copolymer comprising at least one hydrophilic monomer and at least two hydrophobic monomers, wherein at least one of the hydrophobic monomers is methyl styrene which is present in an amount of at least 10% by weight in the copolymer according to the invention based on the total weight of the copolymer.

In one embodiment, the copolymer consists of at least one hydrophilic monomer and at least two hydrophobic monomers, wherein at least one of the hydrophobic monomers is methyl styrene which is present in an amount of at least 10% by weight based on the total weight of the copolymer.

Preferably, the copolymer according to the invention comprises at least one hydrophilic monomer selected from the group of (meth) acrylic acid, maleic acid, maleamic acid, itaconic acid, acrylamide acetic acid, or styrenesulfonic acid, or mixtures thereof, at least one hydrophobic monomer selected from the group of styrene, methyl methacrylate, acrylonitrile, divinyl benzene, trivinyl benzene or mixtures thereof and at least 10% by weight of methyl styrene.

In one preferred embodiment the copolymer according to the invention consists of at least one hydrophilic monomer selected from the group of (meth) acrylic acid, maleic acid, maleamic acid, itaconic acid, acrylamide acetic acid, or styrenesulfonic acid, or mixtures thereof, at least one hydrophobic monomer selected from the group consisting of styrene, methyl methacrylate, acrylonitrile, divinyl benzene, trivinyl benzene and mixtures thereof or at least 10% by weight of methyl styrene.

The term "copolymer" within the context of the present application means a polymer derived from the polymerization of at least three different monomers. At least one monomer is a hydrophilic monomer, and at least two monomers are hydrophobic monomers which are different from each other, and wherein at least one of the hydrophobic monomers is methyl styrene.

Preferably, the copolymer according to the invention is polymerized from at least one hydrophilic monomer selected from the group of (meth) acrylic acid, maleic acid, maleamic acid, itaconic acid, acrylamide acetic acid, or styrenesulfonic acid, or mixtures thereof at least two hydrophobic monomers, wherein at least one hydrophobic monomer is methyl styrene and the other hydrophobic monomer is at least one hydrophobic monomer which selected from the group consisting of styrene, methyl methacrylate, acrylonitrile, divinyl benzene, trivinyl benzene or mixtures thereof. Consequently the copolymer comprises hydrophilic moieties resulting from the use of at least one hydrophilic monomer during the synthesis of the copolymer and hydrophobic moieties resulting from the use of at least two hydrophobic monomers during the synthesis of the copolymer.

In one preferred embodiment, the copolymer according to the invention comprises at least 25% by weight to at most 40% by weight of at least one hydrophilic monomer selected from the group of (meth) acrylic acid, maleic acid, maleamic acid, itaconic acid, acrylamide acetic acid, or styrenesulfonic acid, or mixtures thereof, at least 20% by weight to at most 50% by weight methyl styrene and at least 15% by weight to at most 50% by weight of at least another hydrophobic monomer selected from the group consisting of styrene, methyl methacrylate, acrylonitrile, divinyl benzene, trivinyl benzene or mixtures thereof.

In another preferred embodiment, the copolymer according to the invention consists of at least 25% by weight to at most 40% by weight of at least one hydrophilic monomer selected from the group of (meth) acrylic acid, maleic acid, maleamic acid, itaconic acid, acrylamide acetic acid, or styrenesulfonic acid, or mixtures thereof, at least 20% by weight to at most 50% by weight methyl styrene and at least 20% by weight to at most 50% by weight of at least another hydrophobic monomer selected from the group consisting of styrene, methyl methacrylate, acrylonitrile, divinyl benzene, trivinyl benzene or mixtures thereof.

In a very preferred embodiment, the copolymer according to the invention consists of at least 25% by weight to at most 40% by weight (meth)acrylic acid, at least 20% by weight to at most 50% by weight methyl styrene and at least 15% by weight to at most 50% by weight styrene.

In a further very preferred embodiment, the copolymer according to the invention comprises or consists of at least 25% by weight to at most 36% by weight acrylic acid, at least 30% by weight to at most 44% by weight methyl styrene and at least 20% by weight to at most 40% by weight styrene.

The copolymer according to the invention has the advantage to reduce natural pitch and adhesive contaminants deposition on pulp and paper making equipment. Further, the copolymer according to the invention has the advantage to effectively reduce natural pitch and adhesive contaminants deposition on pulp and paper making equipment in a wide spectrum of water hardness values, e.g. in hard water environment but also in soft water environment, i.e. in an aqueous environment wherein no or only small amounts of divalent metal cations stemming from dissolved divalent metal salts, in particular no or only small amounts of calcium cations or magnesium cations are present.

Another advantage of the copolymer according to the invention is that the copolymer is water soluble. The copolymer according to the invention has the further advantage that commonly used surfactant based dispersants and absorbents like talc are not necessary any more for removal and/or passivation of pitch and/or sticky particles. A further advantage of the copolymer according to the invention is that the copolymer does not contribute to the ash level in the final product. Inorganic absorbents, such as talc, tend to remain with the final cellulosic product, contributing to ash levels. The addition level of the copolymer according to the invention is generally a factor of 10 lower that of the absorbent and makes no contribution to the ash level in the final product. Furthermore, in the pulping process, the copolymer is usually removed along with the contaminants, in a washing-stage procedure.

Further, the copolymer according to the invention has the advantage that it can "trap" a thin film of water if applied to a hydrophobic surface, e.g. of a fabric or a monofilament used for fabric manufacturing and consequently the thus treated surface is rendered hydrophilic. Thus treated fabrics are therefore prone to contamination with hydrophobic substances, like stickies or pitch.

A further advantage of the copolymer according to the invention is that is can bind cationic substances via ionic bonds due to the presence of negatively charged anionic groups within the copolymer according to the invention.

It is particularly preferred that the copolymer according to the invention is not used in combination with surfactant based dispersants and/or absorbents like talc.

In one embodiment, it is excluded that the copolymer according to the invention is used in combination with surfactant based dispersants and/or absorbents like talc.

The term "hydrophilic monomer" within the context of the present application means a monomer or a monomer mixture containing hydrophilic groups like acid groups, e.g. $CO_2^-$ groups rendering a thereof resulting polymer at least partly hydrophilic. Examples for hydrophilic monomers are (meth) acrylic acid, maleic acid, maleamic acid, itaconic acid, acrylamide acetic acid, or styrenesulfonic acid, or mixtures thereof. Acrylic acid is preferred.

The term "(meth)acrylic acid" within the context of the present application covers both monomers methacrylic acid and acrylic acid. Acrylic acid is a monomer having the formula $H_2C=CH—COOH$ and methacrylic acid is a monomer having the formula $H_2C=C(CH_3)—COOH$. In the synthesis of the copolymer according to the invention the monomers acrylic acid and methacrylic acid can be used alone or as mixture. Acrylic acid is preferred.

The use of a hydrophilic monomer in the copolymer according to the invention has the advantage that the copolymer is rendered hydrophilic, i.e. is at least partly soluble in water. Thus, an aqueous solution of the copolymer can be obtained. Further, the hydrophilic moieties derived from the hydrophilic monomer, e.g. from (meth)acrylic acid present in the copolymer according to the invention renders the hydrophobic surface of the pitch and/or sticky particles hydrophilic once the copolymer according to the invention is adhered to the said particles. The hydrophilic moieties present in the copolymer according to the invention have the further advantage that ionic bonds to agents containing positively charged groups can be built. Thus, these agents can be fixed.

The hydrophilic monomer is used in an amount of at least 20% by weight, or at least 21 by weight %, or at least 22% by weight, or at least 23% by weight, or at least 24% by weight, or at least 25% by weight, and at most 40% by weight, or at most 37% by weight, or at most 36% by weight, or at most 35% by weight, or at most 34% by weight, or at most 33% by weight, or at most 32% by weight, or at most 31% by weight, or at most 30% by weight. Advantageously, the hydrophilic monomer is used in amounts of at least 20% by weight to at most 40% by weight, or at least 25% by weight to at most 40% by weight.

The term "hydrophobic monomer" within the context of the present application means a monomer or a monomer mixture providing a rather stiff backbone once polymerized resulting from the presence of structural elements having low degrees of freedom with respect to their rotation due to the presence of for example aromatic rings, ester groups or nitrile groups. Furthermore, the monomer or the monomer mixture is hydrophobic, which means within the context of the present application the physical property of a monomer or a monomer mixture, respectively a therof resulting polymer being repelled from water.

Examples for hydrophobic monomers are methyl styrene, styrene, methyl methacrylate, acrylonitrile, divinyl benzene, trivinyl benzene or mixtures thereof.

The polymer according to the invention comprises at least two hydrophobic monomers, which are different from each other, which means within the context of the present application that at least one hydrophobic monomer is methyl styrene and at one other hydrophobic monomer is selected from the group consisting of styrene, methyl methacrylate, acrylonitrile, divinyl benzene, trivinyl benzene or mixtures thereof. Preferably at least one hydrophobic monomer is styrene.

At least one hydrophobic monomer which is not methyl styrene is used in an amount of at least 15% by, or at least 17% by weight, or weight 20% by weight, or at least 22% by weight, or at least 25% by weight, or at least 27% by weight, or at least 30% by weight, or at least 32% by weight, or 35% by weight, or at least 36 by weight %, or at least 37% by weight, or at least 38% by weight, or at least 39% by weight, or at least 40% by weight and at most 70% by weight, or at most 65% by weight, or at most 60% by weight, or at most 57% by weight, or at most 55% by weight, or at most 54% by weight, or at most 53% by weight, or at most 52% by weight, or at most 51% by weight, or at most 50% by weight, or at most 45% by weight. Advantageously, this at least one hydrophobic monomer is used in amounts of at least 15% by weight to at most 70% by weight, or of at least 15% by weight to at most 55% by weight, or of at least 30% by weight to at most 50% by weight.

The use of a hydrophobic monomer selected from the group consisting of styrene, methyl methacrylate, acrylonitrile, divinyl benzene, trivinyl benzene or mixtures thereof in the copolymer according to the invention has the advantage that the hydrophilic properties of the hydrophilic moieties resulting from the at least one hydrophilic monomer used in the synthesis of the copolymer according to the invention are balanced by the hydrophobic character of the at least one hydrophobic monomer such that the copolymer according to the invention can adhere to the hydrophobic surfaces of e.g pitch and/or sticky particles or other hydrophobic surfaces like for example of monofilaments consisting of hydrophobic polymers like polyethylene terephthalate or polyamide. The surface energy of these hydrophobic surfaces can be increased thereby.

The term "styrene" within the context of the present application means a monomer having the formula $(C_6H_5)-CH=CH_2$.

The term "methyl methacrylate" within the context of the present application means a monomer having the formula $CH_2=C(CH_2)-CO_2-CH_3$.

The term "acrylonitrile" within the context of the present application means a monomer having the formula $CH_2=CH-CN$.

The term "divinyl benzene" within the context of the present application means a monomer having the formula $(C_6H_4)-(CH=CH_2)_2$. The term "trivinyl benzene" within the context of the present application means a monomer having the formula $(C_6H_3)-(CH=CH_2)_3$.

The term "methyl styrene" within the context of the present application means a hydrophobic monomer that combines the structural components of the chemical compounds styrene and toluene. The structure consists of a benzene ring having one substituent in form of an ethylene residue ($-CH=CH_2$) and substituent in form of a methyl residue ($-CH_3$). Depending on the arrangement of the two substituents, there are three constitutional isomers which can be classified as methyl-substituted styrene, i.e. 2-methyl styrene, 3-methyl styrene, and 4-methyl styrene. Furthermore, there are two isomers in which the methyl residue is attached to the ethylene residue, i.e. isopropylene benzene (α-methyl styrene) and 1-propylene benzene (β-methyl styrene). Within the context of the present application the term "methyl styrene" encompasses all above mentioned isomers of methyl styrene, wherein α-methyl styrene is preferred.

Preferably 2-methyl styrene, 3-methyl styrene, 4-methyl styrene or mixtures of these constitutional isomers are used as at least one hydrophobic monomer in the synthesis of the copolymer according to the invention. Particularly α-methyl styrene is used as monomer in the synthesis of the copolymer according to the invention.

The use of methyl styrene in the copolymer according to the invention has the advantage that the glass transition temperature $T_g$ of the copolymer according to the invention can be increased as well as that the performance properties of the copolymer according to the invention of reducing negative effects caused by natural pitch and/or adhesive contaminants in both pulping and papermaking operations can be improved.

Methyl styrene is used in an amount of at least 10% by weight, or at least 12% by weight, or at least 15% by weight, or at least 16 by weight %, or at least 17% by weight, or at least 18% by weight, or at least 19% by weight, or at least 20% by weight and at most 50% by weight, or at most 47% by weight, or at most 45% by weight, or at most 43% by weight, or at most 40% by weight, or 37% by weight, or at most 35% by weight, or at most 34% by weight, or at most 33% by weight, or at most 32% by weight, or at most 31% by weight, or at most 30% by weight. Advantageously, methyl styrene is used in amounts of at least 10% by weight to at most 50% by weight, or of at least 20% by weight to at most 45% by weight.

The synthesis of the copolymer according to the invention is accomplished by means of solution polymerization generally known by a person skilled in the art. In one embodiment, the copolymer according to the invention is made by means of solution polymerization in a first step. The thus obtained copolymer is then contacted with a solution containing at least one base like for example NaOH, in a second step. Thus, the salt form of the copolymer according to the invention can be obtained wherein the negative charges contained in the copolymer according to the invention are balanced by cations stemming from this at least one base used in the second step.

The hydrophilic moieties of the copolymer carry negative charges stemming e.g. from acid groups, like $CO_2^-$-groups or $SO_3^-$ groups which are present in the used at least one hydrophilic monomer. The negative charges of the acid groups can be balanced by monovalent cations selected from $H^+$, or $Li^+$, or $Na^+$, or $K^+$, or $NH_4^+$, ammonium which is mono-, di-, tri- or tetrasubstituted by linear or branched alkyl radical(s), for example $C_1$ to $C_4$ linear or branched alkyl radical(s), or ammonium which is mono-, di-, tri- or tetrasubstituted by linear or branched hydroxyalkyl radical(s), for example $C_1$ to $C_4$ linear or branched hydroxyalkyl radical(s), or ammonium which is di-, tri-, or tetrasubstituted by a mixture of linear or branched alkyl radical(s), e.g. $C_1$ to $C_4$ linear or branched alkyl radical(s), or linear or branched hydroxyalkyl radical(s), for example $C_1$ to $C_4$ linear or branched hydroxyalkyl radical(s), or protonated amino alcohols like preferably protonated aminomethyl propanol or combinations of the listed cations. Preferably the anionic charges of the—acid groups are balanced by $Na^+$ and/or $NH_4^+$ and/or protonated aminomethyl propanol, wherein $NH_4^+$ is particularly preferred.

If the anionic charges of the acid groups, e.g. of $CO_2^-$-groups are balanced by $H^+$, then the "free acid form" of—acid groups, e.g. $CO_2H$-groups are present within the copolymer according to the invention. If the anionic charges of the—acid groups are balanced by other cations $M^+$ like $NH_4^+$, then the "salt form" of the—acid groups, e.g. $CO_2M$-groups are present within the copolymer according to the invention. The salt form of the copolymer according to the invention has the advantage to have an enhanced hydrophilic character, i.e. to be easily soluble in water. Among the cations $M^+NH_4^+$ is particularly preferred, since the corresponding copolymer according to the invention can be produced with low costs, has a good performance already at low concentration ranges and shows a low volatility during drying.

It is particularly preferred that the copolymer according to the invention is not combined with another styrene copolymer containing acrylic acid, maleinimid and/or maleic anhydride.

Copolymers of the following composition are explicitly disclaimed from the present invention: styrene/maleic acid copolymer (50:50 molar ratio) disodium salt; styrene:maleamic acid:maleic acid copolymer (50:25:25 molar ratio), trisodium salt; styrene:acrylonitrile:maleamic acid copolymer (50:10:40 molar ratio), ammonium salt.

The term "glass transition temperature $T_g$" within the context of the present application means the reversible transition in amorphous materials (or in amorphous regions within semi-crystalline materials) from a hard and relatively brittle glassy state into a viscous or rubbery state as the temperature is increased. The glass transition temperature is determined by differential scanning calorimetry.

The copolymer according to the invention has a glass transition temperature $T_g$ of higher than 85° C., e.g. at least 90° C., or at least 95° C., or at least 100° C., at least 105° C., or at least 110° C., or at least 115° C., or at least 120° C., or at least 125° C., or at least 128° C., or at least 130° C.

In one embodiment, the copolymer according to the invention has a glass transition temperature of higher than 85° C., e.g. at least 90° C., or at least 95° C., or at least 100° C., at least 105° C., or at least 110° C., or at least 115° C., or at least 120° C., or at least 125° C., or at least 128° C., or at least 130° C. and at most 180° C., at most 170° C., at most 160° C., at most 155° C. at most 150, at most 145° C., and at most 140° C.

In one embodiment the copolymer according to the invention has a glass transition temperature $T_g$ in the range of at least 105° C. to 170° C., preferably of at least 115° C. to 160° C., preferably at least 125° C. to 155° C., and preferably at least 128° C. to 150° C.

A high glass transition temperature $T_g$ has the advantage to increase the softening point of the surface of the pitch or sticky particles (usually having a very low $T_g$ of about 10° C. to 50° C.), and thus reducing coalescence and adherence to pulp and paper making equipment. The copolymer according to the invention having the high glass transition temperature shows a strong affinity for non-polar, hydrophobic surfaces of e.g. pitch and/or sticky particles. Upon contact of the copolymer with the pitch and/or the sticky particles the copolymer adheres to the hydrophobic surface of the pitch and/or sticky particles via the hydrophobic moieties contained in the copolymer according to the invention. Due to the hydrophilic moieties contained in the copolymer according to the invention, the surface of the pitch and/or sticky particles encapsulated by the copolymer becomes hydrophilic in nature. This has the advantage that the encapsulated (now being hydrophilic on the surface) pitch and/or particles can be dispersed in water. A further advantage is that the agglomeration of the pitch and/or particles is prevented. Further, since the copolymer according to the invention encapsulates the pitch and/or sticky particles by adhering to the particles' surfaces, the softening point of said surfaces is increased due to the high glass transition temperature $T_g$ provided by the copolymer according to the invention. Thus, pitch and/or sticky particles can be effectively removed from the pulp and/or passivated during paper manufacturing, e.g. by means of filtration or coagulation and subsequently following filtration.

In one embodiment of the present application it is excluded that the copolymer according the invention is identical to the copolymer described in the following table. The copolymer described in the following table is known under the trade name Joncryl® 678, which has a $T_g$ of 85° C.:

| Composition | $M_w$ (g/mol) (SEC/PS grading after methylation)* | $M_w/M_n$ (SEC/PS grading after methylation)* | Aqueous ammonia neutralization (solids content = 30%) | Viscosity of the solution at 25° C. (solids content = 30%)** | Viscosity of the solution at 50° C. (solids content = 30%)** |
|---|---|---|---|---|---|
| Styrene:α-methyl styrene:acrylic acid: 1:1:1 | 9300 | 2.44 | Only at 50° C. when pH > 9.5 | ~4000 cP | ~500 cP |

*molar masses of the copolymer expressed as polystyrene equivalent (PS) determined by steric exclusion chromatography (SEC) of the dried polymers in THF at 40° C. at 1 g/l with a flow rate of 1 mL/min on a set of 2 PLgelMIXED B (30 cm) columns with a refractometric and UV detector; $M_w$ = weight-average molar mass; $M_n$ = number-average molar mass
**viscosity of solution measured on a Brookfield type LVTCP viscometer, the temperature of which is regulated by a Haake D8 bath Within the context of the present application the copolymer according to the invention is characterized by means of its weight average molecular weight, which means within the context of the present application the percentages by weight of various molecular weights that comprise a given specimen of a copolymer. The weight average molecular weight of the copolymer according to the invention is determined by means of gel permeation chromatography.

In one preferred embodiment the copolymer according to the invention possesses a weight average molecular weight of at least 7000 g/mol, or of at least 7500 g/mol, or of at least 8000 g/mol, or of at least 8500 g/mol, or of at least 9000 g/mol, or of at least 10000 g/mol, or of at least 10500 g/mol, or of at least 11000 g/mol and at most 20000 g/mol, or at most 18000 g/mol, or at most 17000 g/mol, or at most 16500 g/l, or at most 16000 g/l, or at most 15500 g/l, or at most 15000 g/mol, or at most 14500 g/l, or at most 14000 g/mol, or at most 13500 g/l, or at most 13000 g/l, or at most 12500 g/l, or at most 12000 g/l. Particularly the copolymer according to the invention has a weight average molecular weight in the range of at least 7000 g/mol to at most 20000 g/mol, particularly in the range of at least 8000 g/mol to at most 17000 g/mol.

Furthermore, claimed herein is an aqueous copolymer solution comprising at least one copolymer according to the invention.

Since the copolymer according to the invention is soluble in water aqueous copolymer solutions can be prepared by dissolving the copolymer according to the invention at least partly, preferably completely in a solvent under stirring at ambient temperature (about 23° C.) or at elevated temperature (e.g. above 23° C.).

The term "aqueous copolymer solution" within the context of the present application means that no visible particles, in particular no visible copolymer particles are present in the solution. As solvent tap water or deionized water is used. It is further possible to use mixture of solvents selected from tap water, deionized water and water-soluble organic solvents like alcohols, such as for example methanol or ethanol.

Preferably the concentration of the copolymer according to the invention in the aqueous copolymer solution according to the invention is at least 100 g/l, or at least 125 g/l, or at least 150 g/l, or at least 175 g/l, or at least 200 g/l and at most 400 g/l, or at most 375 g/l, or at most 350 g/l, or at most 325 g/l, or at most 300 g/l, or at most 250 g/l. Advantageously the concentration of the copolymer according to the invention in the aqueous copolymer solution according to the invention is in the range of at least 100 g/l and at most 400 g/l, preferably of at least 150 g/l and at most 350 g/l, and more preferably in the range of at least 175 g/l and at most 300 g/l.

The pH value of the aqueous copolymer solution according to the invention is preferably higher than 7.

Furthermore claimed herein is a method for reducing natural pitch and adhesive contaminants deposition on pulp and paper making equipment characterized in that a copolymer according to the invention is used.

The term "paper" within the context of the present application means a material manufactured in thin sheets from pulp of natural wood sources and/or of waste paper. The term "pulp" describes a cellulosic fibrous material prepared by chemically or mechanically separating cellulose fibers from wood or waste paper. Whether using wood and/or waste paper, the first step is the production of so-called pulp slurry by mixing the wood and/or waste paper with water and applying mechanical forces or chemicals.

The terms "natural pitch" and "pitch" within the context of the application refers to colloidal particles being insoluble in water. In pulp production, wood chips are introduced in a digester to be cooked in a high pressure, high pH and high temperature environment. The composition comprises wood, besides cellulosic pipers, include inorganic material (ash) and organic material such as resin, lignin derivatives, polysaccharide and other extractives.

The term "adhesive contaminants" or "sticky particles" or "stickies" within the context of the present application refers to adhesives of self-adhesive labels, hot melts, adhesive dash components of recycled coated papers and boards that are present in waste paper. Often sticky particles are also referred to a white pitch in prior art documents.

Both pitch and sticky particles have rather low glass transition temperatures $T_g$ of about 10° C. to 50° C. and are therefore sticky under conditions prevailing in pulp and paper making processes.

The term "reducing" within the context of the present application means that the pitch and/or sticky particles are removed from the pulp and/or passivated during the pulp and paper making process.

The copolymer according to the invention, respectively the aqueous copolymer solution according to the invention can be used at any point in the time during pulp and paper making processes. However, appropriate application points in the pulping process are at a washing stage or prior to forming the final sheet on the pulp machine.

Advantageously, the concentration of the copolymer in the aqueous pulp is at least 100 g/tons, or at least 150 g/tons, or at least 200 g/tons, or at least 250 g/t, or at least 280 g/t, or at least 300 g/t, or at least 350 g/t and at most 600 g/tons, or at most 550 g/tons, or at most 500 g/t, or at most 450 g/t, or at most 400 g/t with respect to the dry pulp. In one embodiment the concentration of the copolymer in the aqueous pulp is in the range of at least 100 g/tons and at most 600 g/tons, or at least 250 g/t and at most 500 g/t, or at least 280 and at most 450 g/t with respect to the dry pulp.

Preferably in the method according to the present invention the copolymer according to the invention is used as aqueous copolymer solution according to the invention. Generally, the use of solutions for treatment of pulps is advantageous since a solution provides a more homogenous miscibility of the copolymer according to the invention and the pulp slurry. Thus, the reduction of negative effects caused by natural pitch and adhesive contaminants in the pulp slurry is more efficient. Furthermore, a solution stands for easy metering and the solution form provides better shelf life storage stability compared to aqueous copolymer dispersions.

Furthermore claimed herein is the use of the aqueous copolymer solution according to the invention or the copolymer according to the invention for reducing natural pitch and adhesive deposition on pulp and paper making equipment.

Particularly preferred is the use of the aqueous copolymer solution according to the invention or the use of the copolymer according to the invention in aqueous pulp slurries which comprise only a low concentration of divalent cations, e.g. in pulp slurries of soft and/or medium water hardness. In contrast to other known compositions for reducing the negative effects of pitch and/or sticky particles in pulp and/or paper making, the aqueous copolymer solution according to the invention, respectively the copolymer according to the invention does not need the presence of divalent metal cations to provide a good performance. However, the aqueous copolymer solution according to the invention, respectively the copolymer according to the invention can nevertheless be also used in hard water environments.

The term "water hardness" within the context of the present application refers to the German classification system, i.e. the hardness of water is classified by degree of hardness (dH). It classifies the concentration of calcium and magnesium cations within the water used e.g. for preparation of the pulp slurries. The term soft water refers to a range of 0° to 8.4° dH (<1.5 mmol/L $Ca00_3$) and medium (1.5-2.5 mmol/L $CaCO_3$) refers to a range of 8.4° to 14° dH. Values of >14° dH refer to hard water (>2.5 mmol/L $CaCO_3$). Thus, the use of the aqueous copolymer solution according to the invention or the copolymer according to the invention is particularly preferred in pulp slurries wherein the water hardness of the pulp slurry is in the range of 0° to 14° dH, preferably 0° to 8.4° dH.

Preferably the amount of the aqueous copolymer solution according to the invention applied to the cellulosic pulp slurry is at least 0.01% by weight, or at least 0.1% by weight, or at least 0.2% by weight, at and at most 0.7% by weight, or at most 0.5% by weight, or at most 0.4% by weight, or at most 0.3% by weight based on the dry weight of the cellulosic pulp. Particularly the amount of the aqueous copolymer solution applied to the cellulosic pulp slurry is at least 0.01% by weight to at most 0.5% by weight, more preferably at least 0.1% by weight to at most 0.2% by weight based on the dry weight of the cellulosic pulp.

Furthermore claimed herein is the use of the aqueous copolymer solution according to the invention or the copolymer according to the invention as a fixative for functional cationic additives. Cationic additives are used to facilitate sheet formation in paper manufacturing. These cationic additives contain positively charged groups. The copolymer according to the invention contains negatively charged $CO_2^-$ groups which are attracting the positively charges groups of the cationic additive. Both agents are thus linked via ionic bonds and thus, the cationic additive is fixed by the copolymer according to the invention.

Furthermore, the aqueous copolymer solution of the invention or the copolymer of the invention can advantageously be used in the treatment of fabrics in fiber preparation plants. Fabrics are woven from monofilaments of e.g. polyethylene terephthalate (PET) and polyamide (PA6). The surfaces of these monofilaments are hydrophobic in nature. The copolymer according to the invention displays strong adsorption on the surfaces of the monofilaments and thus increasing the surface energy. A thin film of a hydrophilic liquid like water can then be spread evenly of the surfaces treated with the copolymer according to the invention, respectively treated with the aqueous copolymer solution according to the invention. This method is known as wetting and has the effect that the respective substrates are protected from hydrophobic contamination, such as pitch and stickies. Cleanliness of the manufactured fabrics is maintained and working life extended.

Furthermore, the aqueous copolymer solution of the invention has advantage effects, when used for the showering of washer and thickener fabrics to prevent deposition of stickies and maintain porosity.

EXAMPLES

The invention will now be illustrated by examples, which are to be regarded as illustrative and not delimitative of the invention. Unless otherwise indicated to the contrary, all parts and percentages are by weight.

The glass transition temperature $T_g$ is determined experimentally by differential scanning calorimetry.

The weight average molecular weight is determined by means of gel permeation chromatography.

The number of pitch particles (=counts) is determined using a Neubauer chamber (Haemocytometer). Therefore, pulp samples from various points throughout the pulping and bleaching process were filtered prior to measurement. The filtrate (10 μL) was pipetted onto a Haemocytometer grid and examined under a microscope (1000y magnification). Droplets of pitch were spherical in shape and displayed Brownian motion. The number of particles in a 0.2 mm square were counted and the result (by calculation) was recorded as the number per $cm^3$.

The number of sticky particles (=counts) is determined by the following method. The solution containing the sticky particles was first extracted using dichloromethane. The dissolved stickie solution was then allowed to evaporate in an aluminium dish, containing a 5×5 cm piece of Hardwood pulp sheet. The contaminated piece of pulp is then pulverised with ice cubes in a laboratory blender. The ice hardens the stickie particles and facilitates their dispersion in the water phase. The dispersion was then blended with a 1% Hardwood slurry. A polyester film (A4 sheet) was cut into 4 cm wide strips and each strip placed in a separate 400 ml glass beakers, each equipped with a propeller stirrer. The pulp slurry (200 ml) was added to each beaker. After 15 minutes, the film strips were removed and gently washed with cold water. The strips were then allowed to dry in an oven at 105° C. Image analysis was used to quantify the number and size of stickie particles, attached to the film.

Comparative Example 1

Copolymer consisting of styrene and acrylic acid (Comparative copolymer 1)

2 moles of styrene are copolymerized with 1 mole of acrylic acid in an organic solvent (acetone), using a free radical initiator at a temperature of 75° C. When all monomers have been converted into copolymer chains, the organic solvent is removed by distillation and the copolymer is maintained molten by heating at temperature higher than its glass transition temperature $T_g$. After removal of the organic solvent, the copolymer is cooled under pellets or flakes formation. These pellets or flakes will be then dissolved in water, in the presence of a base, to obtain a copolymer solution in water and in basic media. The concentration of the obtained solution is 25% by weight of copolymer in water.

The copolymer according to comparative example 1 has a glass transition temperature $T_g$ of 100° C. The weight average molecular weight is 8000 g/mol.

Example 2

Copolymer Consisting of styrene/methyl styrene/acrylic acid (copolymer 2 According to the Invention)

2 moles of styrene are copolymerized with 1 mole of acrylic acid and 1 mol of α-methyl styrene, using a free radical initiator at a temperature of 75° C. When all monomers have been converted into copolymer chains, the copolymer is maintained molten by heating at temperature higher than its glass transition temperature $T_g$, and then cooled down to a temperature below 100° C. before being dissolved in water, in the presence of a base, to obtain a copolymer solution in water and in basic media. The concentration of the obtained solution is 18% by weight of the copolymer in water.

The copolymer according to example 2 has a glass transition temperature $T_g$ of 130° C. The weight average molecular weight is 8000 g/mol. The above obtained copolymer solutions are then added to untreated pulp containing soft water (5° to 8° dH) in concentrations given in table 1.

TABLE 1

| Sample | Amount of copolymer solution [kg] (Amount of copolymer with respect to dry pulp [kg/t]) | Count of sticky particles (pitch and stickies) [number of sticky particles] | % Decrease of the number of sticky particles |
|---|---|---|---|
| Blank | 0 (0) | 5314 | 0 |
| Comparative copolymer 1 | 0.5 (0.152) | 4582 | 13.8 |
| Comparative copolymer 1 | 1.0 (0.304) | 3956 | 25.6 |
| Comparative copolymer 1 | 2.0 (0.610) | 3278 | 38.3 |
| Copolymer 2 | 0.5 (0.09) | 1925 | 63.8 |
| Copolymer 2 | 1.0 (0.18) | 580 | 89.1 |
| Copolymer 2 | 2.0 (0.36) | 111 | 97.9 |

From table 1 it can be seen that the copolymer according to the invention effectively reduced the amount of pitch and/or sticky particles present in the cellulosic pulp.

The invention claimed is:

1. A copolymer comprising at least one hydrophilic monomer and at least two different hydrophobic monomers, wherein one of the hydrophobic monomers is methyl styrene, which is present in an amount of at least 10% by weight based on the total weight of the copolymer, wherein the copolymer has a glass transition temperature $T_g$ in the range of higher than 105° C.

2. The copolymer according to claim 1 comprising
   (a) at least one hydrophilic monomer selected from acrylic acid or methacrylic acid or a mixture thereof,
   (b) at least 10% by weight of methyl styrene based on the total weight of the copolymer, and
   (c) at least another hydrophobic monomer selected from the group consisting of styrene, methyl methacrylate, acrylonitrile, divinyl benzene, and trivinyl benzene or a mixture thereof.

3. The copolymer according to claim 1 comprising
   (a) at least 25% and at most 40% by weight of acrylic acid,
   (b) at least 20% and at most 50% by weight of methyl styrene, and
   (c) at least 15% and at most 55% by weight of styrene, wherein the given weight percentage ranges are based on the total weight of the copolymer.

4. The copolymer according to claim 1, wherein the copolymer has a glass transition temperature $T_g$ in the range of higher than 110° C.

5. The copolymer according to claim 1 wherein the copolymer comprises at least one monovalent cation for balancing an anionic charge located at at least one hydrophilic monomer.

6. The copolymer according to claim 5, wherein the at least one monovalent cation is $H^+$, or $Li^+$, or $Na^+$, or $K^+$, or $NH_4^+$, or ammonium which is mono-, di-, tri- or tetrasubstituted by a linear or branched alkyl radical, or ammonium which is mono-, di-, tri- or tetrasubstituted by a linear or branched hydroxyalkyl radical, or ammonium which is di-, tri-, or tetrasubstituted by a mixture of linear or branched alkyl radical(s), or linear or branched hydroxyalkyl radical(s), or protonated amino alcohols or combination of the listed cations thereof.

7. The copolymer according to claim 6, wherein the protonated amino alcohol is protonated aminomethyl propanol.

8. The copolymer according to claim 1, wherein the copolymer has a glass transition temperature $T_g$ of at least 115° C.

9. The copolymer according to claim 1, wherein the copolymer has a glass transition temperature $T_g$ of at least 120° C.

10. An aqueous copolymer solution comprising at least one copolymer according to claim 1.

11. The aqueous copolymer solution according to claim 10, wherein the concentration of the copolymer in the aqueous copolymer solution is in the range of at least 100 g/l to at most 400 g/l.

12. A method for reducing natural pitch and adhesive contaminants deposition on pulp and paper making equipment comprising using a copolymer according to claim 1.

13. The method according to claim 12, wherein the concentration of the copolymer in the pulp is in the range of at least 100 g/tons to 600 g/tons with respect to the dry pulp.

14. The method according to claim 12, wherein the copolymer is used as an aqueous copolymer solution comprising said copolymer.

15. Method according to claim 12, wherein the water hardness of the aqueous pulp lies in the range of 0° dH to 14° dH.

16. Method according to claim 12, wherein the amount of the aqueous copolymer solution applied to the cellulosic pulp slurry is at least 0.01% by weight to at most 0.5% by weight, based on the dry weight of the cellulosic pulp.

17. Method according to claim 12, wherein the amount of the aqueous copolymer solution applied to the cellulosic pulp slurry at least 0.1% by weight to at most 0.2% by weight, based on the dry weight of the cellulosic pulp.

18. Method according to claim 12, wherein the water hardness of the aqueous pulp lies in the range of 0° dH to 8.4° dH.

19. A product comprising the aqueous copolymer solution according to claim 7 or the copolymer thereof for reducing natural pitch and adhesive contaminants deposition on pulp and paper making equipment.

20. A product comprising the aqueous copolymer solution according to claim 10 or the copolymer thereof as a fixative for a cationic additive in paper sheet formation, or in treatment of fabrics in fiber preparation plants to protect resulting fabrics from hydrophobic contamination, or for showering of washer and thickener fabrics to prevent deposition of stickies and maintain porosity.

\* \* \* \* \*